Sept. 18, 1923. 1,468,022
W. C. HUEBNER
PHOTOGRAPHIC PRINTING APPARATUS
Filed April 7, 1919 9 Sheets-Sheet 1
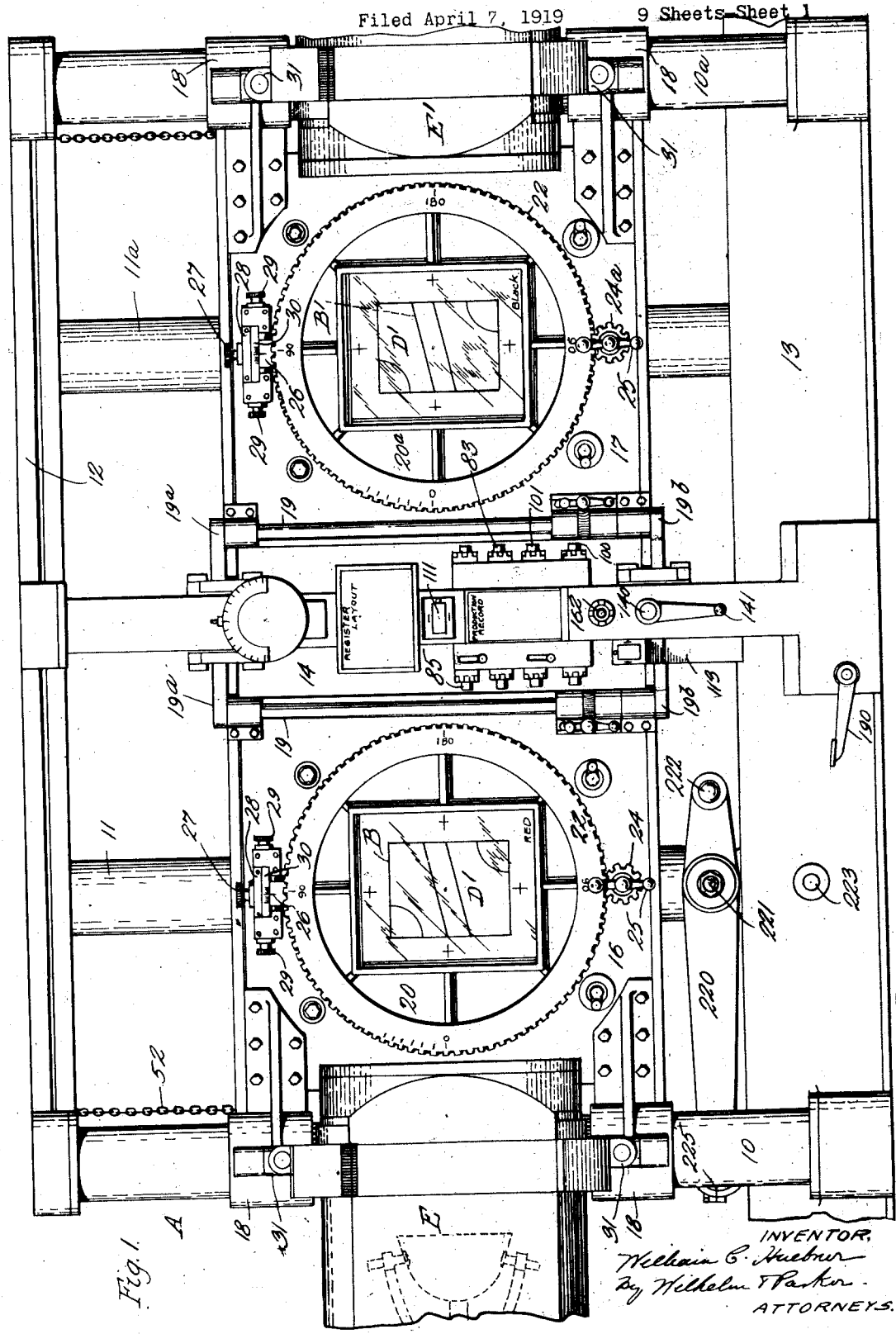

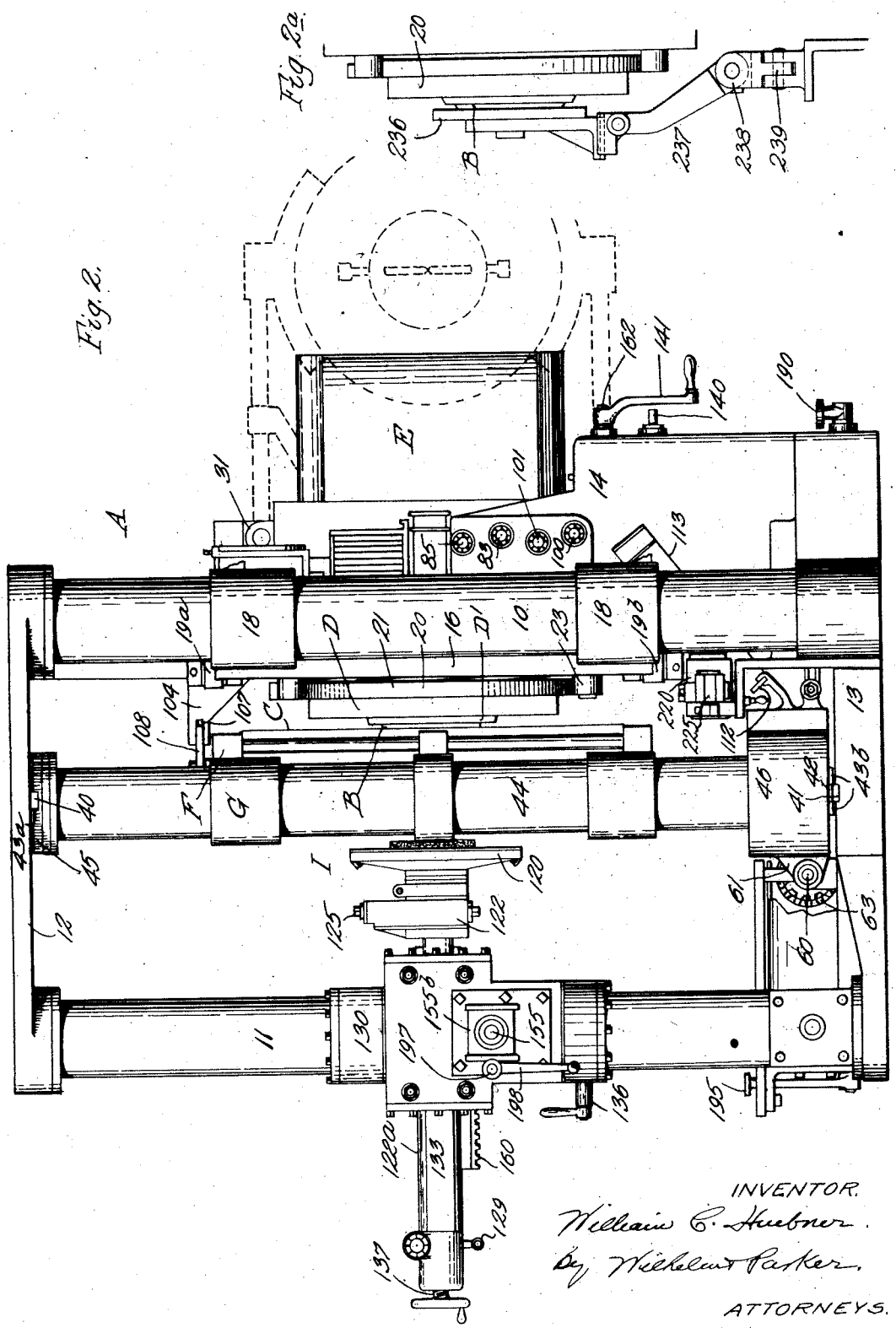

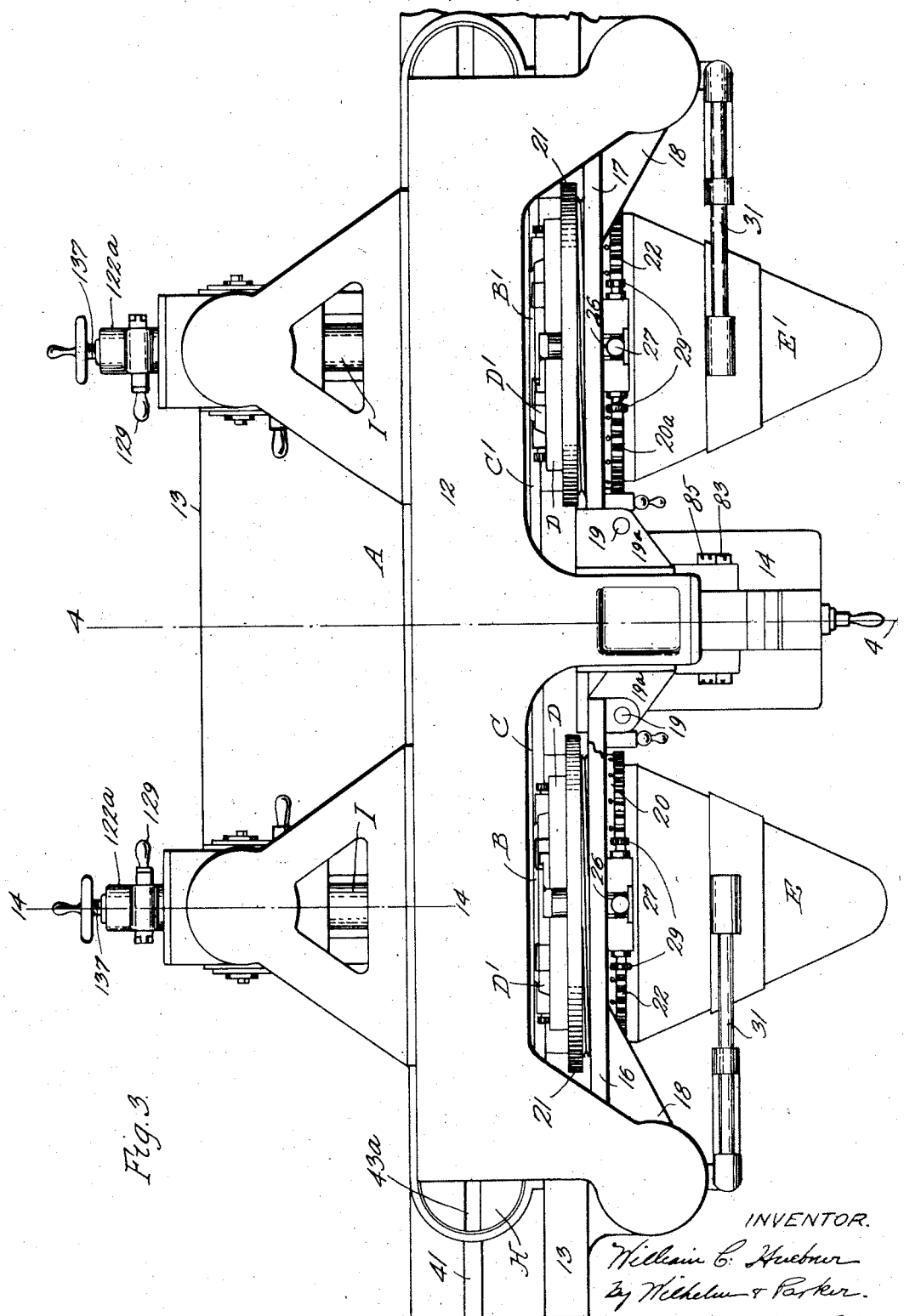

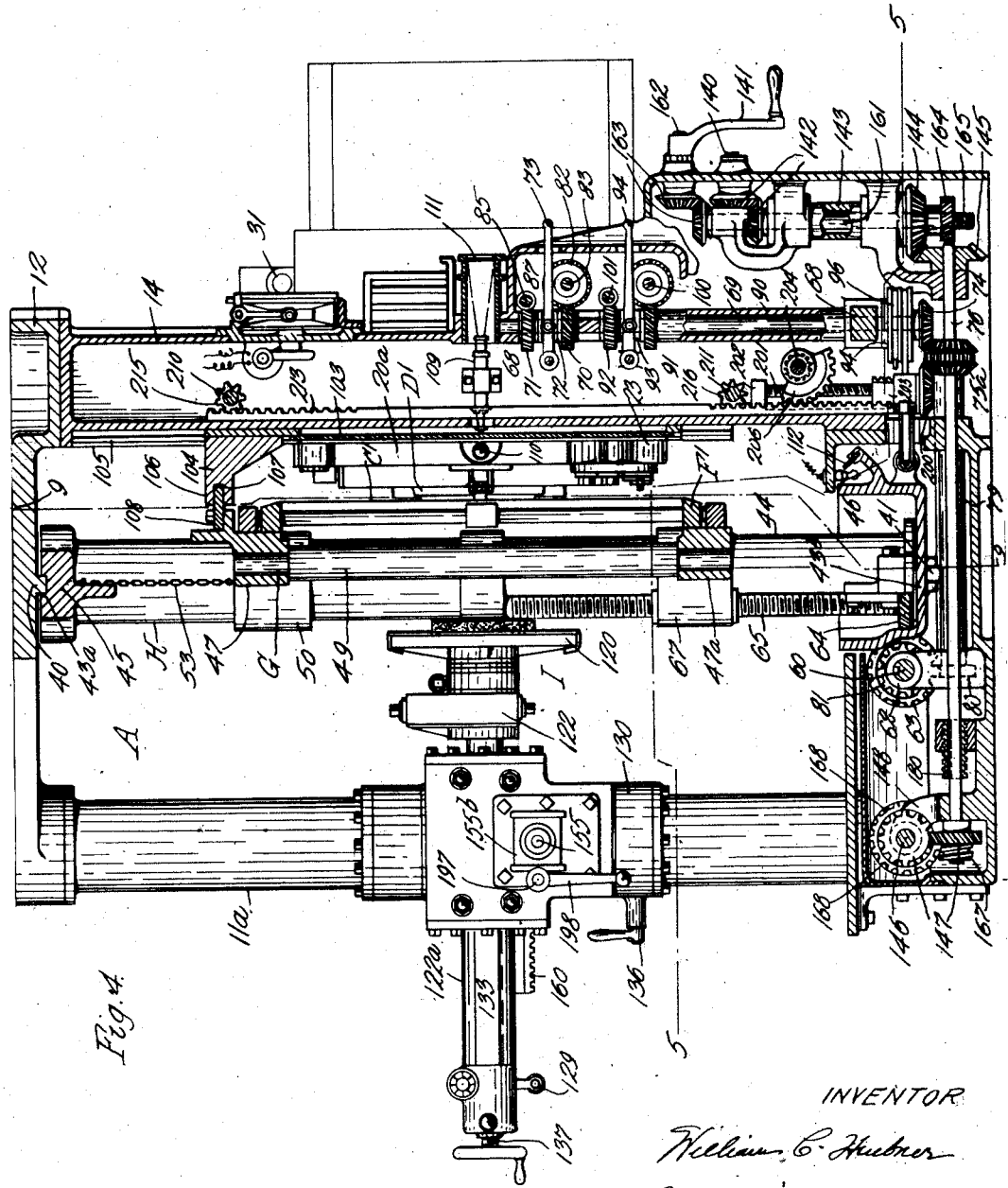

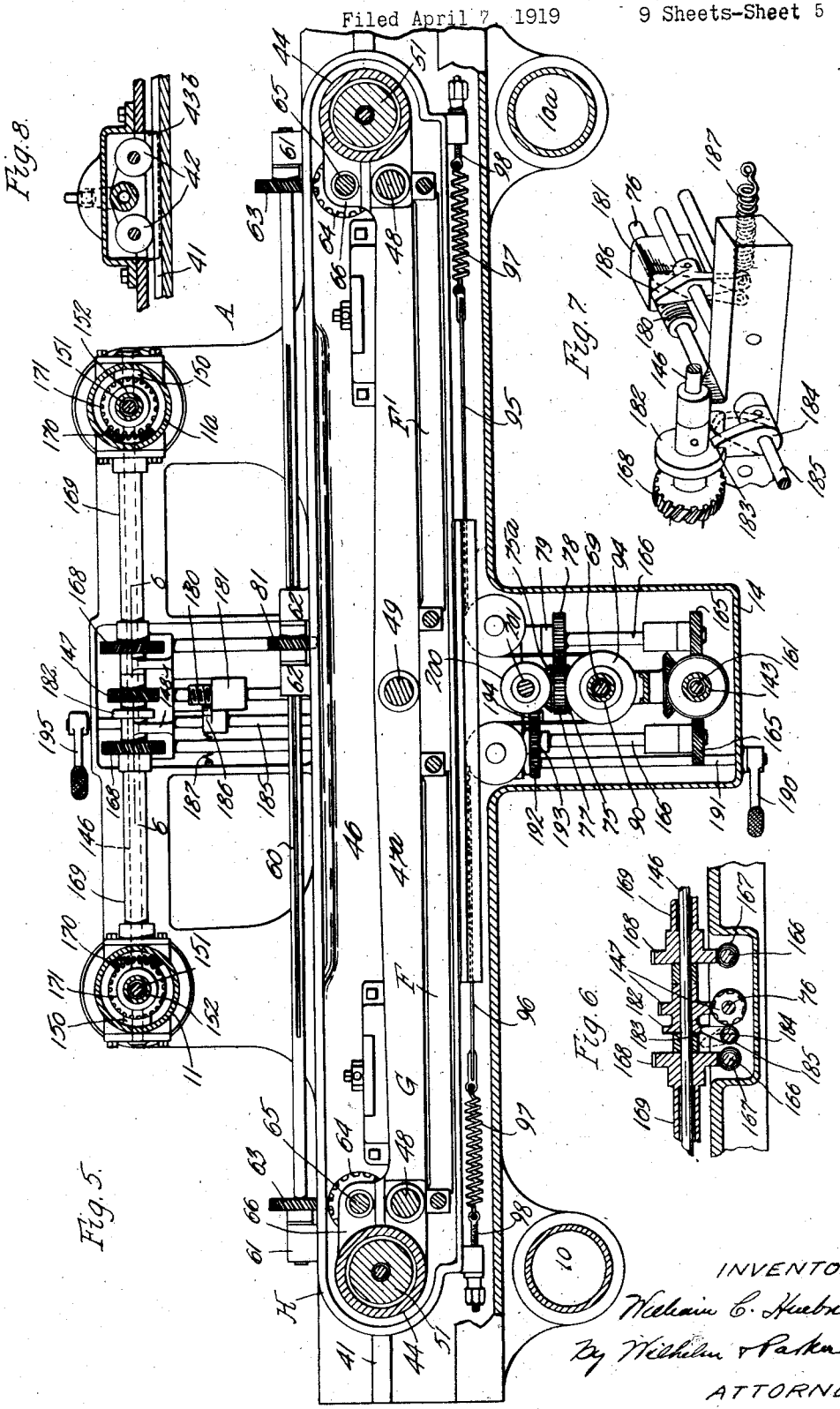

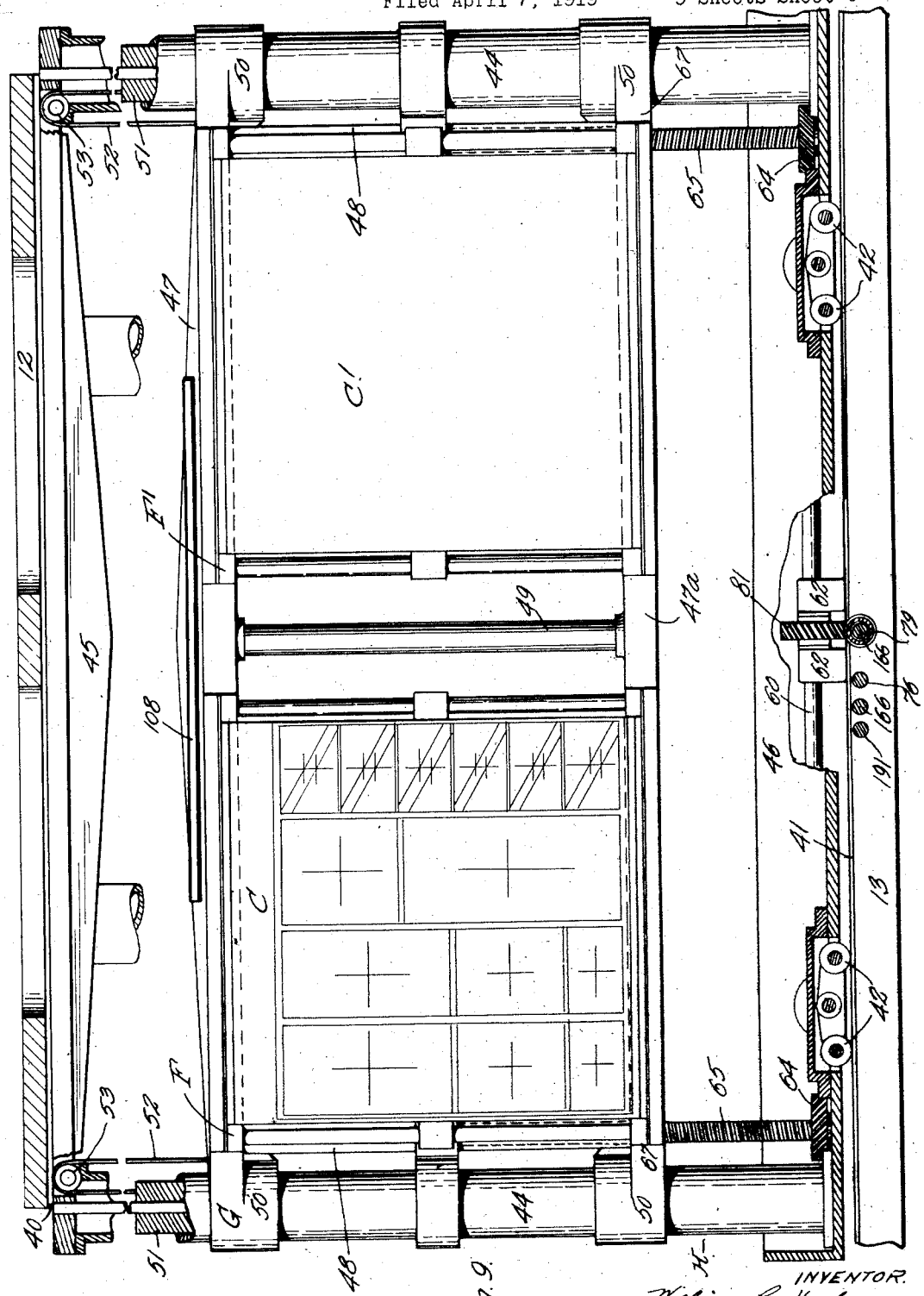

Sept. 18, 1923.
W. C. HUEBNER
PHOTOGRAPHIC PRINTING APPARATUS
Filed April 7, 1919   9 Sheets-Sheet 7
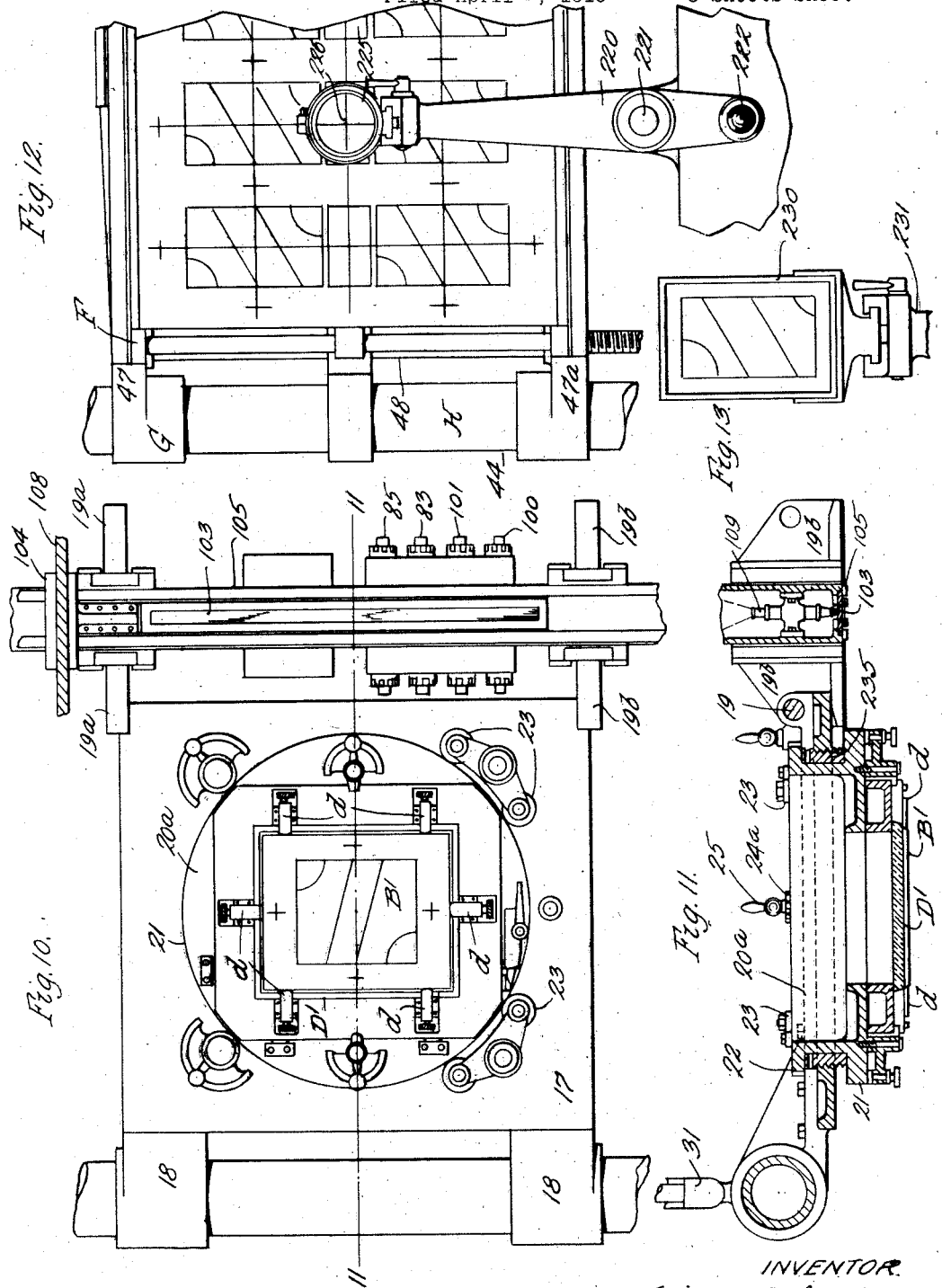

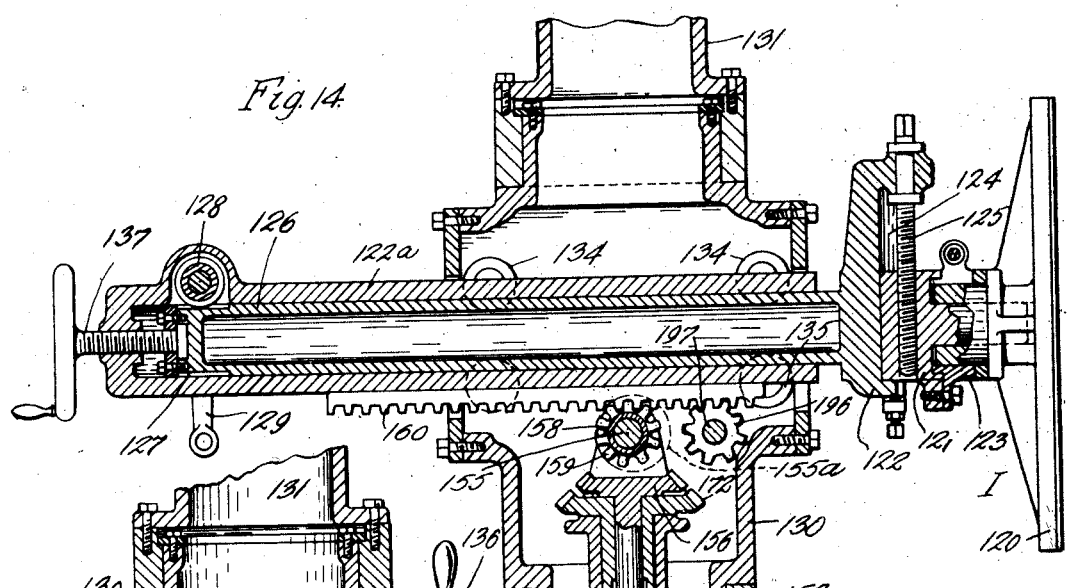

Sept. 18 1923.
W. C. HUEBNER
1,468,022
PHOTOGRAPHIC PRINTING APPARATUS
Filed April 7, 1919     9 Sheets-Sheet 9
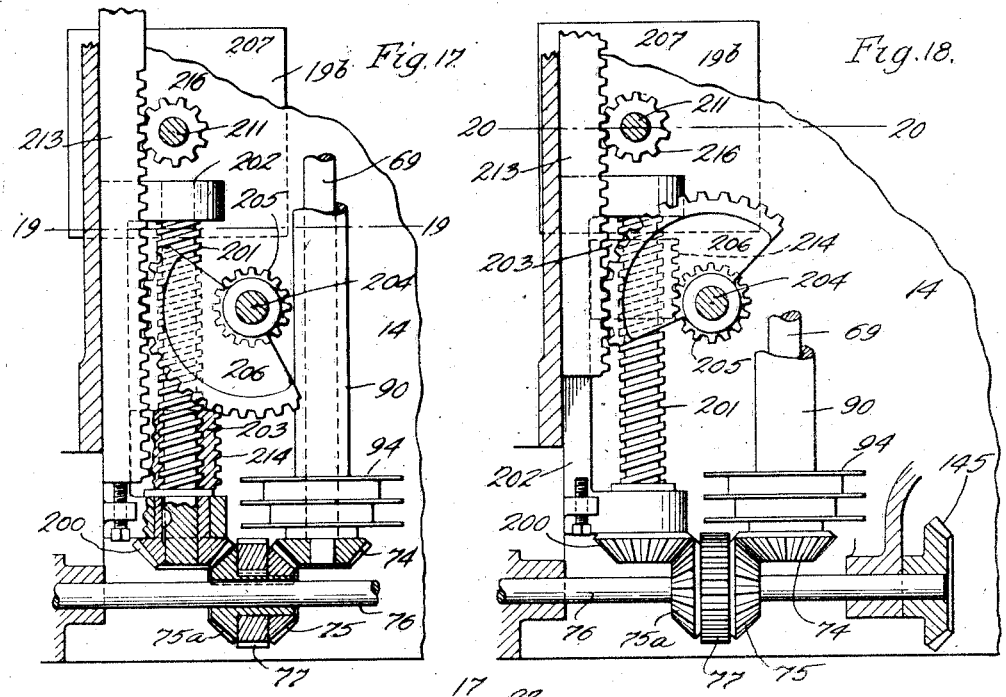
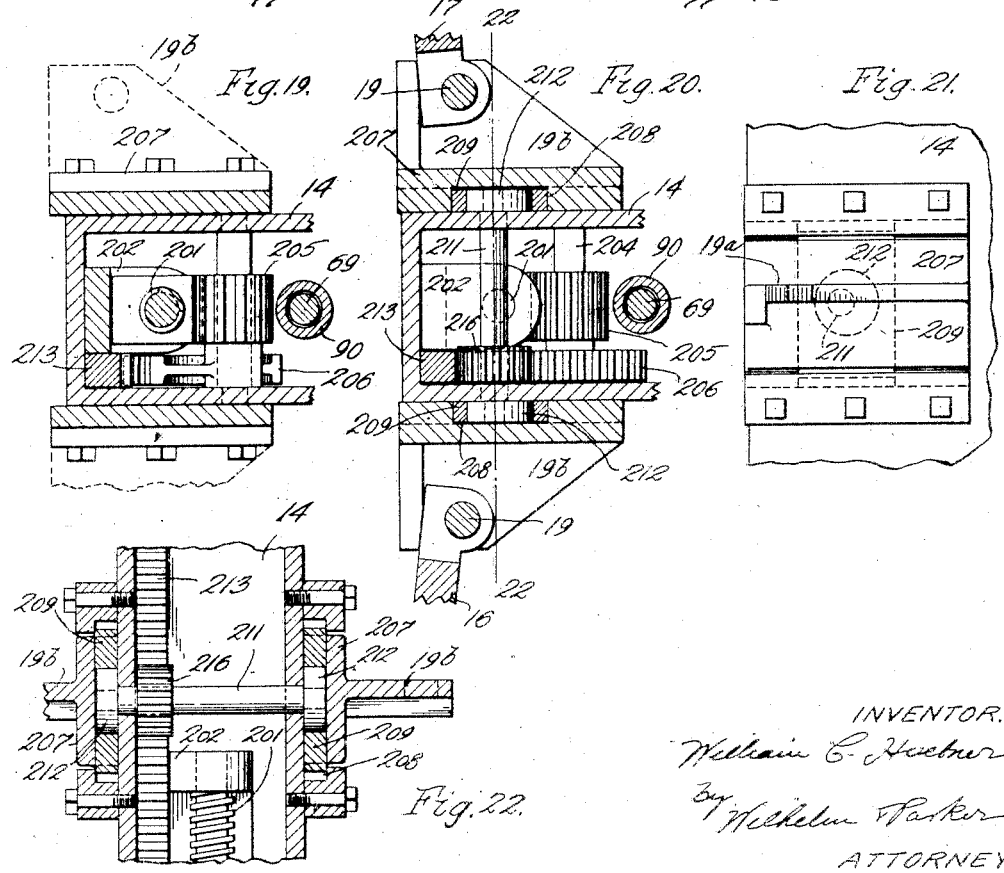
INVENTOR.
William C. Huebner
By Wilhelm Parker
ATTORNEYS.

Patented Sept. 18, 1923.

1,468,...

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PHOTOGRAPHIC-PRINTING APPARATUS.

Application filed April 7, 1919. Serial No. 287,945.

*To all whom it may concern:*

Be it known that I, WILLIAM C. HUEBNER, a citizen of the United States, residing at Buffalo, in the county of Erie and State of New York, have invented a new and useful improvement in Photographic-Printing Apparatus, of which the following is a specification.

This invention relates more particularly to improvements in photographic printing or composing apparatus of the general nature which are intended for photographing any desired number of like or different original prints in any required predetermined and registered position and relative arrangement directly upon the sensitized surfaces of press plates which may be afterwards suitably finished and used in mechanical printing presses for printing in one or more colors. Such apparatus are adapted for various purposes, such for instance as repeating prints from the same transparent printing plate or negative in a required arrangement on a single sensitized press plate, which, after development, is used for mechanically printing a plurality of impressions; for composing work where it is desired to place different subjects in a predetermined arrangement on the press plate; and for making press plates for multicolor printing where it is necessary to photograph prints in exact register on the different sensitized press plates that are used in presses for printing the different colors.

One object of the invention is to produce a photo composing apparatus whereby two press plates can be made at one time by one operator in about the same time and with about the same amount of labor formerly required to produce one plate. Other objects are to produce an apparatus by which two sensitized plates can be printed simultaneously with the several impressions or images on the two plates in exact register with each other; also to provide means whereby a register press plate can be produced by either visual register or micrometer readings or by both methods coordinated so as to serve as a double check up and to furnish a graphical record of position readings in which the exposures are made; also to enable the operator to use a layout sheet, key sheet printed press sheet, or a stick-up plate such as is used in hand transfer methods, together with a sensitized plate placed in the apparatus side by side facing the operator, and to adjust both together as one unit for positioning the prints on the sensitized plate in accordance with the layout or copy; also to enable the operator to quickly follow up by visual registration, the changed positions of prints on press sheets where the change in position is due to variations in the paper caused by atmospheric changes, and at the same time produce a press plate carrying the succeeding color prints so that they will register with the average changed position of the prints on the printed sheets; also to enable the operator to place a finished press plate in the apparatus and check up the work by either or both visual register and micrometer readings, and at the same time produce another press plate for the same color, or for another color of the same job; also to produce a photographic printing or composing apparatus of improved construction whereby it is possible to secure results, hereinafter explained, which are not possible with apparatus heretofore used; and also to improve photographic printing or composing apparatus in the other respects hereinafter described and set forth in the claims.

In the accompanying drawings:

Fig. 1 is a front elevation of a photographic printing apparatus embodying the invention, showing the lamp housings swung to their inoperative positions at the sides thereof and being partly broken away.

Fig. 2 is a side elevation thereof.

Fig. 2ª shows the use of a registering device for positioning a printing plate.

Fig. 3 is a plan view thereof.

Fig. 4 is a longitudinal sectional elevation thereof on line 4—4, Fig. 3.

Fig. 5 is a horizontal sectional plan thereof on line 5—5 Fig. 4.

Fig. 6 is a fragmentary transverse sectional elevation thereof on line 6—6, Fig. 5, showing part of the driving means for the pressure devices.

Fig. 7 is a fragmentary perspective view thereof.

Fig. 8 is a fragmentary transverse sectional elevation showing one of the roller supports and guide for the main carriage for the sensitized plates.

Fig. 9 is a transverse vertical section on line 9—9, Fig. 4, of the carriage and supporting means for the sensitized plates.

Fig. 10 is a rear elevation of the supporting device for one of the printing plate holders with a printing plate in position thereon.

Fig. 11 is a horizontal sectional plan view thereof on line 11—11, Fig. 10.

Fig. 12 is a fragmentary front elevation of the carrying frame and one of the holders for the sensitized plates, showing a "layout" sheet mounted thereon and the registering and centering device therefor in operative position.

Fig. 13 is a fragmentary elevation of a modified form of centering device in which a transparent positive or glass plate is used.

Fig. 14 is a vertical sectional elevation of one of the pressure devices on line 14—14, Fig. 3.

Fig. 15 is a similar view thereof at right angles to Fig. 14.

Fig. 16 is a fragmentary side elevation thereof.

Fig. 17 is a fragmentary sectional elevation of the means used for moving the printing plate to and from the printing position, with the parts in the contact position.

Fig. 18 is a similar view with the parts in clearance position.

Fig. 19 is a horizontal section on line 19—19, Fig. 17.

Fig. 20 is a horizontal section on line 20—20, Fig. 18.

Fig. 21 is a side elevation of one of the keepers to which the printing plate holder supports are bolted.

Fig. 22 is a transverse vertical section on line 22—22, Fig. 20.

The apparatus hereinafter described in detail comprises, briefly stated, a support on which two sensitized press plates, or a press plate and a layout sheet or other copy, are arranged side by side; supports for holding a transparent photographic negative or printing plate (hereinafter called the "printing plate") in front of the sensitized surface of each press plate; two pressure devices for causing intimate uniform contact of the sensitized surfaces with the printing plates; means for causing light to act through the printing plates for photographing the prints on the sensitized surfaces; adjusting means for producing like relative movements between the sensitized plates and their companion printing plates parallel with the sensitized surfaces to enable the prints to be made in predetermined corresponding locations and positions on the two sensitized surfaces; and means for producing a relative movement between the sensitized and printing plates toward and from each other to place the plates into contact for printing and to separate them to enable the necessary relative adjustments of the plates. As shown in the drawings, the apparatus is constructed as follows:

A is a frame preferably composed of tubular columns or uprights 10, 10ᵃ at the front thereof and columns 11, 11ᵃ at the rear, these columns being connected at the top by a casting or member 12 and at the bottom by a base or casting 13. At the center of the front of the apparatus and between the columns 10, 10ᵃ is arranged a housing or hollow upright 14. In Figs. 1 and 3 of the drawings are shown two printing plates B B' which are alike and similarly positioned side by side and are adapted to be illuminated to produce prints or impressions in corresponding positions on two sensitized plates, shown at C C'. For supporting the printing plates B B', swinging supports or frames 16 and 17 are used, which are alike and are pivoted by hinges 18 respectively on the columns 10, 10ᵃ to swing into an operative position side by side in the same vertical plane. The swinging supports are held stationary in their operative positions by means of vertical bolts 19 which enter holes in top and bottom brackets or keepers 19ᵃ 19ᵇ arranged on each side of the central housing 14 of the main frame. The swinging supports 16, 17 are provided with circular openings in which are mounted and adapted to be adjusted rotatably, index heads 20 and 20ᵃ each of which carries a holder D for one of the printing plates B B'. Each index head, as shown, consists of a circular disk 21 and a gear ring 22 disposed on opposite sides of the vertical plate forming the support 16 or 17 and is rotatably supported in the opening of the head by rollers 23 on which the circular edge of the disk 21 is adapted to roll. For rotating the index heads, pinions 24, 24ᵃ are used which are journaled on the swinging support and mesh with the gear rings 22 and are turned by suitable handles 25. The index heads are preferably locked in their adjusted positions by means of dogs 26 having teeth which engage the teeth of the gear rings 22 and are moved into and out of engagement with the gear rings by operating screws or the like 27. In order to enable a very fine accurate adjustment of the index heads, these locking dogs are preferably mounted on slides 28 which are adapted to be adjusted on the swinging supports tangentially relatively to the gear rings by adjusting screws 29. The index heads can be adjusted to any desired fractional portion of a tooth movement of the index head by the tangential adjustment of the locking dogs, such fractional adjustment being indicated by suitable register marks or graduations on the adjustable slides for the locking dogs and on the guide brackets 30 in which the slides move. The index heads 21 have openings therethrough large enough for the passage of light to illuminate all parts of the largest printing plate for which the machine is adapted. Any suitable means may be used for adjustably mounting the printing plates B B' on the plate holders D. Each of the plate holders shown in the drawings, see Fig. 10 consists of a rectangular metal frame carrying a fixed glass or transparent supporting plate D' on the face of which the printing plate is adjustably secured by suitable jaws or devices d. These jaws engage the beveled edges of the printing plate and are adapted to be moved toward and from the printing plate. For illuminating the printing plates, arc lamps or the like are preferably provided in housings or light chambers E E'. Each housing is supported on swinging brackets 31 pivoted on the hinges 18 of the companion swinging support 16 or 17 and are adapted to swing to and from an operative position in front of the printing plates, and so that the swinging supports for the printing plates are made accessible and may be swung on the hinges 18 to a position in which the printing plates may be adjusted or changed. Any other suitable means may be employed for confining and directing the light as may be necessary or desirable in the use of the apparatus.

The sensitized press plates C C' are preferably supported in a plane parallel with the faces of the printing plates B B' (when the latter are in their operative position) in plate holders F and F' which are mounted on a carrying frame G arranged to move vertically parallel with the plane of the sensitized plate. The carrying frame G with the two plate holders F F' mounted thereon is mounted on a main carriage H which is movable horizontally in a plane parallel with the sensitized plates, on guides 40, 41 respectively on the top member 12 and base 13 of the main frame A, see Figs. 2–5 and 9. This carriage H, as shown, is provided at each of its opposite ends with a pair of supporting rollers 42 arranged to roll on the guides 41 on the base 13. The carriage is caused to travel accurately in a straight line by means of guide grooves 43$^a$ and 43$^b$ at its top and bottom which engage the guides 40 and 41. The carriage is preferably formed by upright tubular end posts 44 connected at their tops by a cross bar 45 having a groove for the reception of the guide 40, and at their bottoms by a base member 46 having the rollers 42 mounted thereon.

The vertically adjustable carrying frame G preferably consists of horizontal top and bottom bars 47, 47$^a$ rigidly connected by vertical end bars 48 and a central bar 49. This frame is slidably mounted on the tubular posts 44 of the carriage H by means of bearings 50 and is preferably counterbalanced by weights 51 which are movable up and down in the tubular posts 44 and are connected to the carrying frame by chains or the like 52 passing over pulleys 53.

The sensitized plate holders F F' may be of any suitable construction adapted to hold the sensitized plates smooth and taut thereon in a predetermined position. They are preferably constructed like the holders shown in my copending application Serial No. 262,076, filed November 11, 1918.

Since the sensitized plates C C' are mounted on holders which are alike and arranged on the carrying frame G in like relation to the two printing plates B B', any movement of the carrying frame G in a vertical direction, or any movement of the carriage H in a horizontal direction, will result in moving both sensitized plates C C' simultaneously either vertically or horizontally, precisely the same distance and securing precisely corresponding positions of each sensitized plate relative to its printing plate.

Any suitable means may be employed for adjusting the carrying frame G and carriage H respectively vertically and horizontally for placing any desired corresponding portion of the two sensitized plates C C' opposite their respective printing plates B B'.

The adjusting means for the vertically movable carrying frame G is preferably constructed as follows:

A horizontal shaft 60 is journaled at the base of the carriage H in suitable bearings 61, 62 and is connected at its ends by spiral gears 63, 64 to two upright screws 65 suitably journaled in bearings 66 on the ends of the carriage. The screws turn in threaded nuts or parts 67 secured to the opposite ends of the carrying frame G, so that when the shaft 60 is turned the screws will rotate simultaneously and raise or lower the carrying frame.

The shaft 60 is rotated as follows:

Suitably journaled in the hollow standard 14 is an upright shaft 69, provided at its upper end with a loose spiral gear 70 and a loose worm wheel 71 and between them is a clutch member 72 splined on the shaft so that, by means of a lever 73, either the spiral gear or the worm wheel may be connected to the shaft for rotating it. Fixed on the lower end of the shaft 69 is a bevel pinion 74 meshing with a bevel pinion 75 loosely arranged on the hub of a bevel pinion 75$^a$, which latter is keyed or fixed to a longitudinal horizontal shaft 76 journaled in the base of the apparatus, see Figs. 4, 17 and 18. The purpose of the pinion 75$^a$ will be later explained. A gear wheel 77 secured to the pinion 75 meshes with a gear wheel 78 fixed to a hollow shaft 79, also journaled in the base of the machine, see Figs. 5 and 9, and having a spiral gear 80 at its rear end which meshes with spiral gear 81 splined on the shaft 60 between the bearings 62, 62, therefor so as to permit the shaft to slide lengthwise through the gear 81. If the shaft 69 is rotated, the hollow shaft 79 will turn and by the described connections will rotate the shaft 60 and the screws 65 of the carrying frame G and raise or lower said frame. When a quick or coarse adjustment of the carrying frame is desired, the spiral gear 70 is connected to the shaft 69 by means of the clutch 72, and the spiral gear 70 rotated by means of another spiral gear 82 on a horizontal shaft 83 arranged in the housing 14 and which may be turned by a suitable crank or handle, engaging either of its exposed ends which are suitably fashioned for this purpose. In order to facilitate a fine accurate adjustment of the carrying frame, a fine adjusting shaft 85 is provided which is mounted in a similar manner to the quick adjusting shaft 83 and is adapted to be similarly turned by a crank. A worm 87 on this shaft meshes with the worm wheel 71, on the shaft 69. After the carrying frame has been adjusted coarsely to an approximate position by turning the shaft 83, the spiral gear 70 is disconnected from the shaft 69 and the fine adjusting worm wheel 71 connected thereto and turned by means of the shaft 85 to give the desired accurate adjustment of the carrying frame.

The means shown for effecting the horizontal adjustment of the carriage H comprises a hollow shaft 90 surrounding the shaft 69 and having a spiral gear 91 and worm wheel 92 at the upper end thereof and between which is arranged a clutch member 93 splined on the hollow shaft. Either the spiral gear or the worm wheel may be connected to the shaft 90 by means of the clutch member 93, which is operated by a lever 94. The lower end of the hollow shaft 90 is provided with a drum 94 to which are connected, one above the other, two flexible bands or straps 95, 96. The opposite ends of these bands are adjustably secured to the opposite ends of the carriage H, see Fig. 5, so that when the drum is revolved by means of the hollow shaft 90 one of the bands, for instance, the band 96, will be wound on the drum while the other band, 95, will be unwound therefrom, thus moving the carriage to the right in Fig. 5. For moving the carriage in the opposite direction, the hollow shaft 90 is turned in the opposite direction. To prevent lost motion and slack between the bands 95, 96 and the drum, the ends of the bands are preferably connected to coil springs 97 under tension, which are secured to the ends of the carriage by means of adjusting screws 98 or otherwise. These springs are strong enough to overcome the resistance of the sliding carriage and as the pull is applied to one of them it will extend somewhat, while the other one will contract, thus taking up all slack and lost motion. Any other suitable means may be used to transmit the motion of the shaft 90 to the carriage.

For effecting the coarse or quick adjustment of the carriage, a coarse adjusting shaft 100 is provided having a spiral gear meshing with the spiral gear 91, and for the fine adjustment a fine adjusting shaft 101 is used having a worm engaging the worm wheel 92. Either the spiral gear 91 or the worm wheel 92 may be connected to the hollow shaft 90 by means of the clutch 93, and the adjustment made by turning either the shaft 100 or the shaft 101, as above explained in connection with the adjustment of the carrying frame.

The adjustment of the carrying frame is preferably indicated by a suitable graduated scale 103, Fig. 4, arranged vertically on a slide 104 connected to the carrying frame. This slide 104 is mounted to slide vertically on guides 105 on the rear of the upright column 14 and has a rearwardly projecting part 106 provided with a horizontal groove 107 which receives a horizontal bar or tongue 108 secured to the top of the carrying frame G, see Figs. 2, 4 and 9. This construction enables the carrying frame to move horizontally relatively to the slide 104, during the adjustment of the carriage, but any vertical adjustment of the carrying frame will cause the slide to move therewith. The scale 103 moves past a microscope 109 arranged in the housing 14. A small electric lamp 110 is used for illuminating the scale, which is transparent, and the microscope projects an enlarged image of the scale onto a ground glass or screen 111 at the front of the housing 14.

The horizontal adjustment of the carriage H is preferably indicated in a similar manner by a scale 112, Fig. 4, secured directly on the carriage and adapted to be read by a microscope projecting device 113, similar to that above explained in connection with the scale for the carrying frame.

I I represent two pressure devices for pressing the sensitized plates into firm contact with the printing plates. Each pressure device, see Figs. 14–16, comprises a pressure block 120 which is faced with suitable yielding material adapted to engage the rear face of the sensitized plate and is removably and adjustably secured on a head 121 which is radially adjusted on another head 122 which, in turn, is rotatably and slidably adjustable in a sleeve 122ª in the column 11 or 11ª. For removably securing the pressure block on the head 121, a split clamp 123 is shown and this head is adjusted radially in a guide 124 of the head 122 by means of a screw 125. For rotatably adjusting the block 120, the shank 126 of the head 122 is milled at 127 to form a worm wheel with which meshes a worm 128 mounted on the sleeve 122ᵃ and is turned by a suitable crank 129.

For the purpose of enabling the pressure blocks to be swung around where they will be accessible and can be changed or adjusted, the columns 11, 11ᵃ are provided with swiveled sections 130 which are arranged to turn horizontally between upper and lower fixed sections 131, 132. The sleeves 122ᵃ carrying the heads 121, 122 are mounted in these swiveled sections or supports by means of lateral ribs or tracks 133 on the sleeves engaging oppositely disposed upper and lower rollers 134, 135 journaled in the swiveled supports 130. Each swiveled section 130 is normally locked in the position shown in Figs. 2, 4 and 14 with the face of the pressure block disposed parallel with the sensitized plate, by a bolt or latch 136 of any suitable construction which is mounted on the column and enters a hole in the swiveled section and prevents it from turning. By releasing the latch the section 130 may be revolved to bring the pressure device to a position where it is readily accessible. Each pressure device is preferably adapted to be moved to and from a position in which it clears the sensitized plate, with its front face a predetermined distance from the back of the plate, which is called the "clearance position," and for compensating for differences in the thickness of the sensitized plates, the pressure block may be adjusted nearer to or farther from the plate by a screw 137 swiveled in the end of the shank of the head 122 and having a threaded engagement with the outer end of the sleeve 122ᵃ. The screw is turned by a hand wheel at its end for giving the desired adjustment.

For moving the pressure devices to the "clearance position" and then applying the final pressure to secure a firm contact between the sensitized plates and the printing plates, the following means are preferably employed:

On the column 14, and preferably adjacent the operating means for the carriage H and carrying frame G, is arranged a short shaft or stud 140 provided with a crank or handle 141. The rear end of this shaft is connected by bevel gears 142 with the upper end of a tubular shaft 143 journaled in the column 14. The lower end of the shaft 143 is connected by bevel gears 144, 145 to the rearwardly extending horizontal shaft 76, the rear end of which is connected to a transverse horizontal shaft 146 by spiral gears 147. The shaft 146 is journaled in central bearings 148 and in bearings 149 at its ends in the bases of the columns 11, 11ᵃ. Arranged in each column, and journaled at its lower end in a swiveled bearing 150, is an upright shaft 151 which is connected to the shaft 146 by bevel pinions 151ᵃ and is surrounded by a hollow shaft 152 having its upper end journaled in a yoke 153, the oppositely extending arms 154 of which are pivoted on a transverse shaft 155. This shaft, in the construction shown, is fixed to eccentrics 155ᵃ mounted to rotate in slide blocks 155ᵇ at the sides of the swiveled section 130, see Fig. 15. At the upper end of the shaft 151 is a bevel gear 156 which meshes with a bevel gear 157 on a sleeve 158 surrounding the eccentric shaft 155, and said sleeve is provided with a pinion 159 which meshes with a toothed rack 160 on the sleeve 122ᵃ to move this sleeve and the pressure block to and from the "clearance position." The pressure device is moved from the "clearance position" into contact with the sensitized plate for applying the final strong pressure, and is returned to the clearance position preferably as follows:

The tubular shaft 143 at the front of the machine surrounds a shaft 161, which is adapted to be rotated by means of the crank 141 on a stub shaft 162 connected to the shaft 161 by bevel gears 163. At the lower end of the shaft 161 is a spiral gear 164 which meshes with spiral gears 165 on the front ends of two parallel rearwardly extending horizontal shafts 166, each of which is provided at its rear end with a worm 167. One of these shafts extends through the tubular shaft 79, see Fig. 5. The worms 167 mesh with worm wheels 168 arranged on the inner ends of two hollow shafts 169 surrounding the transverse horizontal shaft 146, said shafts bearing at their outer ends in the columns 11, 11ᵃ. Each of these hollow shafts has fixed to its outer end, and within one of the hollow columns, a bevel gear 170 engaging a bevel gear 171 on the lower end of the hollow upright shaft or sleeve 152, and the upper end of this shaft is provided with a bevel gear 172 which meshes with a bevel gear 173 keyed to the transverse eccentric shaft 155 for rotating this shaft. This shaft, as before stated, is fixed to the eccentrics 155ᵃ and as the lower ends of the shaft 151 and the tubular sleeve 152 are supported by the swiveled bearing 150, the upper ends of these shafts will rock or swing on the pivot for the bearing 150, when the shaft 155 is rotated to turn the eccentrics, on account of their yoke connection with the upper end of the shaft 155. If, therefore, the pinion 159 be held from rotation, the rocking or oscillation of the shafts 151, 152 by means of the eccentrics 155ᵃ will cause the sleeve 122ᵃ and the pressure device mounted thereon to move the pressure block from the clearance position to the contact position and apply the necessary pressure for close contact between the printing plate and sensitized plate.

The following means are preferably employed to hold the pinion 159 from rotation during the above described operation:

The rearwardly extending shaft 76 is provided near its rear end with a threaded part 180 which turns in a sliding nut or block 181 having a flat face which prevents it from turning by engaging with the base of the machine. A disk 182 fixed on the transverse shaft 146 has a notch 183 for the reception of a locking arm 184 rigidly secured on a rock shaft 185 parallel to the shaft 76. This rock shaft is also provided with a fixed rock arm or lever 186 which is normally held in engagement with the side of the sliding nut 181 by a spring 187, or otherwise, in which position the locking arm 184 is held out of contact with the disk 182. The shaft 76 can then be turned to effect the quick adjustment of the pressure device. During this quick adjustment the rotation of the shaft 76 will cause the nut 181 to move forwardly along the threaded part 180 until it clears the rock arm 186. The spring 187 will then rock the shaft 185 and press the arm 184 against the disk 182 and the arm will enter the notch 183 when said notch moves into register therewith. The shaft 146 is now held from rotation and the pinion 159 of the pressure device will be locked to the rack 160. Consequently when the final pressure device is operated to rock the eccentrics 155$^a$ as explained, the sleeve 122$^a$ and the pressure device will be given a forward movement, depending upon the throw of the eccentrics 155$^a$. For releasing the locking arm 184 from the disk 182 to permit the nut 181 to be returned on the shaft 76 and again engage the rock arm during the reverse or rearward movement of the pressure devices, a treadle 190 at the front of the machine is used. As shown, this treadle is fixed to a rock shaft 191 having thereon a pinion 192 in mesh with an idler pinion 193 on one of the shafts 166. The idler in turn meshes with another pinion 194 on the forward end of the rock shaft 185. By depressing the treadle 190 and thus rocking the shaft 185, the arm 184 will be moved away from the disk 182. In order to enable the operator to perform the foregoing operation while he is at the back of the machine, another treadle 195 is secured directly to the rear end of the rock shaft 185. To permit the operator to move the pressure devices quickly in and out while at the back of the machine, each device is provided with an additional pinion 196 which is secured on a shaft 197 in the swiveled section 130 of the column, meshes with the rack 160, and is operated by a hand crank 198.

When adjusting the carriage H and the carrying frame G for positioning the sensitized plates, it is necessary that the sensi- plates be out of contact with the print- ing plates so that they may be moved freely in their vertical plane without interference or injury to the plates. For this purpose the printing plates are preferably retracted from their printing position by the following means:

The bevel pinion 75$^a$, which is keyed to the shaft 76, meshes with a bevel pinion 200 on the lower end of an upright screw shaft 201 journaled in a bracket 202 on the rear wall of the frame housing 14, see Figs. 17–22. A threaded nut or block 203 arranged to travel up and down on this screw has its rear face engaging the vertical surface of the bracket 202 to prevent it from turning. During the quick adjustment of the pressure devices, the bevel pinion 75$^a$ turns the screw 201 and the nut moves upwardly thereon. A horizontal shaft 204 arranged adjacent the shaft 201 has secured thereon a pinion 205 and a gear segment 206. The keepers 19$^a$, 19$^b$ for the bolts 19 of the swinging supports 16 and 17 have vertical flanges 207 which are provided with rectangular openings 208, each of which receives a vertically sliding eccentric block 209. This block is confined in said opening between a plate affixed to the outer side of the keeper and the side wall of the housing 14. Extending transversely through the housing 14 at the top and bottom thereof are shafts 210, 211 respectively on the ends of which are secured eccentrics 212 which are seated in holes in the eccentric blocks 209. The keepers 19$^a$, 19$^b$ may be shifted by the rotation of the eccentrics 212. If, therefore, the bolts 19 are engaged in the keepers, the swinging supports for the printing plates may be moved a slight distance on their pivots 18 to withdraw the printing plates from contact with the sensitized plates, by rotating the eccentric shafts 210, 211. These shafts are rotated by a toothed rack 213 arranged to slide vertically in the housing 14 and to be engaged by the gear segment 206. The nut or block 203 is provided on its front face with rack teeth 214, which, in the position shown in Fig. 18, engage the pinion 205, thereby rotating the shaft 204 and gear segment 206 and moving the rack bar 213. The rack bar meshes with pinions 215, 216 on the shafts 210, 211, and when the rack bar is actuated the pinions cause the eccentrics 212 to revolve and shift the swinging supports 16 and 17 away from the sensitized plates.

During the usual operations of adjusting the pressure devices I I, the nut 203 does not travel high enough to engage and rotate the pinion 205 and consequently the printing plates are not moved away from the sensitized plates, but when an exposure has been made and it is desired to move the sensitized plates to a new location, a continued movement of the crank shaft 140 which is used to effect the withdrawal of the pressure devices, causes the screw 201 to raise the nut 203 far enough to rotate the pinion 205 and connected eccentrics 212.

As above described, the apparatus is adapted to be used to produce two press plates simultaneously from two similar or dissimilar printing plates and the successive prints will occupy exactly corresponding positions on both sensitized plates. This enables, for instance, the rapid production of the several plates necessary for the different colors of a multi-color job. It is at times necessary, however, to produce a press plate from a layout sheet, key sheet, printed press sheet or a "stick-up" plate such as is used in hand transfer methods. In such case the layout sheet or other copy may be secured on one of the plate holders F in place of a sensitized plate and a sensitized plate mounted on the other holder F', both layout sheet and sensitized plate being secured on the holders in like positions. Then by adjusting the holder F so as to cause one of the images or register marks in the layout sheet or copy to register with a registering device or printing plate on the companion printing plate holder, the sensitized plate on the other holder F' will be correspondingly positioned, and a print can be made thereon from the printing plate B' exactly in position required by the layout or copy.

220 represents a registering or centering device which is pivoted on the base of the machine at 221, see Figs. 1 and 12. The device has a spring pin or latch 222 of any suitable sort which is adapted to engage a recess 223 to hold the centering device in a vertical position, as shown in Fig. 12. The centering device has mounted thereon a glass disk 225 having cross lines 226 which coincide exactly with the center of the adjacent printing plate holder. If the swing support 16 is swung out of the way and the centering device is swung to the position shown in Fig. 12, the holder with the layout sheet may be adjusted until the cross marks on the centering device register with register marks on the layout sheet. The sensitized plate on the other holder F' will of course be adjusted at the same time and the corresponding point thereon will be in exact register with the center of the printing plate B'. Contact may now be made between the sensitized plate C' and the printing plate B' opposite thereto to produce an impression in the position required by the register marks on the layout sheet. The glass disk is preferably adjustable on the centering device 220 toward and from the layout sheet so that it can be placed close to the sheet to ensure precision of register.

In Fig. 13 is shown a slightly modified form of registering and centering device in which a rectangular frame 230 is used for supporting a glass or transparent positive of one of the images on the layout sheet or copy, so that when this centering device is used direct visual register of the image may be secured. The frame 230 is also preferably adjustable on its support 231 so that the transparent plate can be placed against or close to the layout sheet or copy.

The construction described enables the operator to adjust a layout sheet in register with the visual indicator. The sensitized plate C' will occupy the same relative position opposite the printing plate B' to be exposed, and during the exposure period, the operator can read the micrometer scales, which indicate in thousandths of an inch the position, both vertically and horizontally, occupied by the print being exposed, and he can copy these readings on a small layout sheet which can be used for succeeding prints. In such case the visual register sheet is dispensed with for succeeding colors of the same job, as micrometer register can be more speedily obtained than visual register, providing duplicate registrations are required.

When a printed press sheet is used as a guide to duplicate exactly the locations of the prints on the press sheet, it is necessary to locate the subjects in definite relation to the gripper and side guide positions of the plate so that the new plate can be placed on the cylinder of a printing press in the required position for register. The operator therefore places the printed sheet exactly in the required position on a supporting plate in one of the holders F and F' and uses the visual registering device in the manner explained. Or he could register a transparent printing plate or negative in one of the holders D directly with the printed sheet. By this means the operator is enabled to produce a duplicate register press plate with all of the prints placed exactly in the same relative positions as on the printed sheet. He can thus duplicate a job on which a reprint edition is required, or a job which has been hand-transferred for some colors and it is desired to produce photo-composed press prints of other colors to complete the work. Thus results are obtained quickly and easily, which could not otherwise be done as accurately and economically.

When it is required to produce a set of register color prints from a layout sheet on which the position of the various prints are indicated by center lines crossing each other at right angles, the following steps are taken:—The layout sheet is mounted upon a supporting metal plate and placed in the photo-composing apparatus. Along side of the layout sheet is mounted a sensitized metal plate, opposite the metal plate and facing it is mounted the negative which is to be exposed. When the register indicator is in register with the center lines for one position on the layout sheet, the negative is exposed to the sensitized metal plate, and during exposure the vertical and horizontal readings are copied upon a small layout sheet. This operation is repeated until the plate has been exposed for the number of positions required by the layout sheet. In this way the exact register readings for the layout sheet is obtained and at the same time a press plate is produced for the first color. On the succeeding colors, the layout sheet is dispensed with and two sensitized metal plates are placed in the apparatus and two negatives of other colors are exposed to the same position readings obtained by the visual registration of the first plate.

This is also a convenient method for registering complicated label or inset subjects as time is saved in speedily adjusting to the space which is to carry the inset to register with the visual register indicator.

When it is desired to check up a metal plate with an "image to image check up," then a negative or positive is mounted upon the index head facing the metal plate to be checked. The metal plate can then be adjusted to the various position readings and the negative or positive can be adjusted to contact with the surface of the metal plate. Thus the two images can be seen and any discrepancy in register can be quickly detected, and the metal plate can be further adjusted until it is in exact register and the correct reading so obtained will be an exact guide for making further duplicate plates of the one so checked up.

Two index heads or negative carriers are provided, either of which or both can be used for registering or checking up work, as well as for photo-composing purposes. The index heads are used particularly where rotary adjustments are necessary for accurate work.

The layout or other guide sheet may be replaced by a transparent glass negative or positive with duplicate images which are to be followed for register with the visual registering device. In such case the plate would be illuminated from the back so that all of the images would be clearly visible under the registering device, by adjusting the holder F so as to cause one of the images or register marks in the layout sheet or copy to register with a registering device or printing plate on the companion printing plate holder, the sensitized plate on the other holder F' will be correspondingly positioned, and a print can be made thereon from the printing plate B' exactly in position required by the layout or copy.

As shown in Fig. 11, each of the index heads 20, 20ᵃ may be adjustably secured on the opening of its support 16 or 17 by means of a screw ring 235. This permits the index head to be adjusted toward or from the sensitized plates to compensate for variations in the thickness of different printing plates.

A visual registering or positioning device, such as described, carrying an image or cross lines, can be mounted in a predetermined position either facing the transparent printing plate, or the layout sheet or other guide on one of the holders F, F'. In this way the device can be used either for accurately centering or positioning the printing plate on its holder, or for determining the exposure position as indicated on the layout sheet, printed press sheet or other guide device used for the visual registration of photo-composed prints. Fig. 2ᵃ illustrates a registering or positioning device 236, which may carry either a transparent image or cross lines, arranged to face the transparent printing plate B on the holder 20. This device, like the devices 225 and 230, is preferably removably secured on its support 237 so that it can be placed to face either way. The support 237 shown has hinge joints 238 and 239 disposed at right angles to each other to enable the device to be swung into and out of position between the holders B and F. A holder on which a transparent printing plate which has been accurately positioned by means of this visual position indicator, can then be removed and placed upon the second index head, and another holder can be mounted on the first index head, and another transparent printing plate registered in exactly the same position as that occupied by the first transparent printing plate. Hence both index heads will carry transparent printing plates with their images accurately placed in the same relative position. In this way the position indicator performs the function of predetermining the register of the image on the transparent printing plate as well as finding the exposure positions on the layout sheet or other devices.

I claim as my invention:

1. In a photographic printing apparatus, the combination of means for supporting two sensitized plates side by side facing the same way, means for supporting a transparent printing plate opposite each of said sensitized plates, common means for causing simultaneous like relative adjustments between both of said sensitized plates and the opposing printing plates in a direction for placing the printing plates opposite different corresponding portions of the two sensitized plates, means for independently adjusting said printing plates toward and from said sensitized plates, and common means for placing said printing plates and sensitized plates into and out of contact, and means for causing an intimate contact of the sensitized and printing plates.

2. In a photographic printing apparatus, the combination of means for supporting two sensitized plates side by side, means for supporting a transparent printing plate opposite each of said sensitized plates, common means for adjusting both of said sensitized plates simultaneously and correspondingly in a direction to place different corresponding portions thereof opposite said printing plates, means for independently adjusting said printing plates toward and from said sensitized plates, common means for movin said printing plates to place them into and out of contact with said sensitized plates and means for causing an intimate contact of the sensitized and printing plates.

3. In a photographic printing apparatus, the combination of means for supporting two sensitized plates side by side, means for supporting a transparent printing plate opposite each of said sensitized plates, common means for adjusting both of said sensitized plates simultaneously and correspondingly in different directions substantially parallel with their sensitized surfaces to place different corresponding portions thereof opposite their related printing plates, common means for placing said printing plates and sensitized plates into and out of contact and independently adjustable means for causing an intimate contact of the related sensitized and printing plates.

4. In a photographic printing apparatus, the combination of means for supporting two sensitized plates side by side, means for supporting a transparent printing plate opposite each of said sensitized plates, common means for causing simultaneous like relative adjustments between said sensitized plates and the opposing printing plates in a direction for placing the printing plates opposite different corresponding portions of the two sensitized plates, means for independently adjusting said printing plates toward and from said sensitized plates, common means for causing relative movement between said sensitized and printing plates for placing them into and out of contact, and means for causing an intimate contact of the sensitized and printing plates.

5. In a photographic printing apparatus, the combination of means for supporting two sensitized plates side by side, means for supporting a transparent printing plate opposite each of said sensitized plates, common means for adjusting both of said sensitized plates simultaneously and correspondingly in a direction to place different corresponding portions thereof opposite their related printing plates, means for causing independent adjustments between the printing plates and their related sensitized plates toward and from each other, and common means for moving said printing plates into and out of contact with said sensitized plates.

6. In a photographic printing apparatus, the combination of means for supporting a sensitized plate and a sheet in corresponding positions, means for supporting a printing device and a registering device opposite said plate and sheet respectively in corresponding relation thereto, common means for causing simultaneous like relative adjustments between said plate and sheet and the opposing devices in a direction to place said devices opposite different corresponding portions of their related plate and sheet, and means for causing an intimate contact of said plate with the opposed printing device.

7. In a photographic printing apparatus, the combination of means for supporting a sensitized plate and a sheet in corresponding positions, means for supporting a printing device and a registering device opposite said plate and sheet respectively in corresponding relation thereto, common means for adjusting said plate and sheet simultaneously and correspondingly in a direction to place different corresponding portions thereof opposite said devices, and means for causing an intimate contact of said plate with the opposing printing device.

8. In a photographic printing apparatus, the combination of means for supporting a sensitized plate and a sheet side by side, means for supporting a printing device and a registering device opposite said plate and sheet respectively in corresponding relation thereto, means for causing simultaneous like relative adjustments between said plate and sheet and the opposing devices in a direction to place said devices opposite different corresponding portions of their related plate and sheet, means for causing relative movement between said plate and sheet and the opposed devices for placing them into and out of contact, and means for causing an intimate contact of said plate and printing device.

9. In a photographic printing apparatus, the combination of means for supporting a sensitized plate and a sheet side by side, means for supporting a transparent printing plate and a registering device opposite said sensitized plate and sheet respectively in corresponding relation thereto, means operatively connecting said plate and sheet for adjusting said sensitized plate and sheet simultaneously and correspondingly in a direction to place different corresponding portions thereof opposite said printing plate and registering device respectively, and means for moving said printing plate into and out of contact with the opposed sensitized plate.

10. In a photographic printing apparatus, the combination of means for supporting a sensitized plate and a sheet in corresponding positions, means for supporting a transparent printing plate and a registering device facing said sensitized plate and sheet respectively in corresponding relation thereto, common means for causing simultaneous like relative adjustments between said sensitized plate and sheet and the opposing printing plate and registering device in a direction to place said printing plate and registering device opposite different corresponding portions of said sensitized plate and sheet, and means for causing an intimate contact of said printing and sensitized plates.

11. In a photographic printing apparatus, the combination of a common support on which a sensitized plate and a sheet are mounted side by side, means for supporting a transparent printing plate and a registering device facing said sensitized plate and sheet respectively in corresponding relation thereto, means for adjusting said support to cause simultaneous like relative adjustments between said sensitized plate and sheet and the opposing printing plate and registering device in a direction to place said printing plate and registering device opposite different corresponding portions of said sensitized plate and sheet, and means for causing an intimate contact of said printing and sensitized plates.

12. In a photographic printing apparatus, the combination of means for supporting two sensitized plates side by side, means for supporting a transparent printing plate opposite each of said sensitized plates, common means for causing simultaneous like relative adjustments between said sensitized plates and the opposing printing plates in a direction for placing the printing plates opposite different corresponding portions of the two sensitized plates, means for causing relative movement between said sensitized and printing plates for placing them into and out of contact, and independently adjustable pressure devices arranged opposite said printing plates and operable to press said sensitized plates into firm contact with said printing plates.

13. In a photographic printing apparatus, the combination of means for supporting a sensitized plate and sheet in corresponding positions, means for supporting a printing device and a registering device opposite said plate and sheet respectively in corresponding relation thereto, means for causing simultaneous like relative adjustments between said sensitized plate and sheet and the opposing devices in a direction to place said devices opposite different corresponding portions of the sensitized plate and sheet, means for causing relative movement between said sensitized plate and the opposed printing plate for placing them into and out of contact, and a pressure device arranged opposite said printing device and operable to press the interposed plate into firm contact with said printing device.

14. In a photographic printing apparatus, the combination of means for supporting two plates in corresponding positions, means for supporting transparent printing plates in operative positions opposite said plates in corresponding relation thereto, a registering device adapted to be arranged opposite one of said plates, common means for adjusting both of said plates simultaneously and correspondingly in a direction to place different corresponding portions thereof opposite said registering device and one of said printing plates, and means for causing an intimate contact of said printing plate with the opposed plate.

15. In a photographic printing apparatus, the combination of means for supporting two plates side by side, means for supporting transparent printing plates in operative positions opposite said plates in corresponding relation thereto, one of said printing plates being movable away from its said operative position, a registering device adapted to be arranged substantially in the position of said removed printing plate, means for adjusting both of said plates simultaneously and correspondingly in a direction to place different corresponding portions thereof opposite said registering device and said other printing plate, and means for causing an intimate contact of said last mentioned printing plate with the opposed plate.

16. In a photographic printing apparatus, the combination of means for supporting two plates side by side, means for supporting a transparent printing plate opposite one of said plates, a visual registering device adapted to be arranged in corresponding relation opposite the other plate, means for adjusting both of said plates simultaneously and correspondingly in a direction to place different corresponding portions thereof opposite said registering device and said printing plate, means for causing an intimate contact of said printing plate with the opposed plate, and indicating means showing the adjustments of said plates.

17. In a photographic printing apparatus, the combination of means for supporting two plates side by side, means for supporting transparent printing plates in operative positions opposite said plates in corresponding relation thereto, common means for adjusting said first-mentioned plates simultaneously and correspondingly in a direction to place different corresponding portions thereof opposite their related printing plates, independent adjusting means for said printing plates, common means for moving said printing plates into and out of contact with said other plates, a pressure device arranged opposite each of said printing plates, and means for moving said pressure devices to press said plates into firm contact with said printing plates.

18. In a photographic printing apparatus, the combination of means for supporting two plates in corresponding positions, means for supporting transparent printing plates in operative positions opposite said plates in corresponding relation thereto, common means for adjusting said first mentioned plates simultaneously and correspondingly in a direction to place different corresponding portions thereof opposite said printing plates, means for adjusting said printing plates independently of each other relative to the opposed plates, common means for moving said printing plates into and out of contact with said other plates, independently adjustable pressure devices arranged opposite said printing plates, and means for moving said pressure devices to press said plates into firm contact with said printing plates.

19. In a photographic printing apparatus, the combination of means for supporting two plates in corresponding positions, means for supporting transparent printing plates in operative positions opposite said plates in corresponding relation thereto, common means for adjusting said first mentioned plates simultaneously and correspondingly in a direction to place different corresponding portions thereof opposite said printing plates, common means for moving said printing plates into and out of contact with said other plates, a pressure device arranged opposite each of said printing plates, means for adjusting said pressure devices independently of each other relative to the opposed plates, and means for moving said pressure devices to press said plates into firm contact with said printing plates.

20. In a photographic printing apparatus, the combination of means for supporting two plates in corresponding positions, means for supporting transparent printing plates in operative positions opposite said plates in corresponding relation thereto, means for adjusting said first mentioned plates simultaneously and correspondingly in a direction to place different corresponding portions thereof opposite said printing plates, means for adjusting said printing plates independently of each other toward or from the opposed plates, common means for moving said printing plates into and out of contact with said other plates, a pressure device arranged opposite each of said printing plates, means for adjusting said pressure devices independently of each other relative to the opposed plates, and common means for moving said pressure devices to press said plates into firm contact with said printing plates.

21. In a photographic printing apparatus, the combination of means for supporting two plates side by side, means for supporting transparent printing plates in operative positions opposite said plates in corresponding relation thereto, means for adjusting said first mentioned plates simultaneously and correspondingly in a direction to place different corresponding portions thereof opposite said printing plates, means for independently adjusting said printing plates toward said other plates, means for moving said printing plates simultaneously into and out of contact with said plates, independently adjustable pressure devices arranged opposite said printing plates, and common means for moving said pressure devices simultaneously to press said plates into firm contact with said printing plates.

22. In a photographic printing apparatus, the combination of holders for a sensitized plate and a sheet, a common support on which said holders are mounted in corresponding positions, means for supporting a printing device and a registering device in operative positions opposite said holders in corresponding relation thereto, means for adjusting said common support in a direction to place different corresponding portions of said holders opposite their related devices, said devices being movable into and out of said operative positions, and means for moving said printing device into and out of contact with the opposed plate.

23. In a photographic printing apparatus, the combination of holders for two plates, a frame on which said holders are mounted side by side, two swinging supports for holding two transparent printing plates in operative positions opposite said holders in corresponding relation thereto, means for adjusting said frame in a direction to simultaneously place different corresponding portions of said holders opposite said printing plates, said swinging supports being arranged to swing to and from their operative positions, means for independently adjusting each printing plate toward or from the opposing plate, and means for moving said printing plates into and out of contact with the opposed plates.

24. In a photographic printing apparatus the combination of holders for two plates, a frame on which said holders are mounted side by side, two swinging supports for holding two transparent printing plates in operative positions opposite said holders in corresponding relation thereto, means for adjusting said frame in a direction to simultaneously place different corresponding portions of said holders opposite said printing plates, said swinging supports being arranged to swing to and from their operative positions, means for independently adjusting each printing plate toward or from the opposing plate, keepers to which said swinging supports are locked for holding the supports stationary, and common means for operating said keepers to move said swinging supports to carry said printing plates into and out of contact with the opposed plates.

25. In a photographic printing apparatus, the combination of means for supporting a sensitized plate and a sheet in corresponding positions, means for adjustably supporting transparent printing plates opposite said plate and sheet, a registering device adapted to be placed in registering relation either with one of said printing plates or the opposed sheet, means for adjusting said plate and sheet correspondingly in a direction to place different corresponding portions thereof opposite said registering device and one of said printing plates, and means for causing an intimate contact of said last mentioned printing plate with the opposed plate.

26. In a photographic printing apparatus, the combination of means for supporting a sensitized plate and a sheet in corresponding positions, means for adjustably supporting transparent printing plates opposite said plate and sheet, a registering device mounted to move to and from registering position between one of said printing plates and the opposed sheet, means for adjusting said plate and sheet correspondingly in a direction to place different corresponding portions thereof opposite said registering device and one of said printing plates, and means for causing an intimate contact of said last mentioned printing plate with the opposed plate.

27. In a photographic printing apparatus, the combination of means for supporting a sensitized plate and a sheet in corresponding positions, means for adjustably supporting transparent printing plates opposite said plate and sheet and a registering device mounted to move to and from registering position between one of said printing plates and the opposed sheet, said device being reversible for cooperation either with said printing plate or said opposed sheet.

28. In a photographic printing apparatus, the combination of means for supporting a sensitized plate and a sheet side by side facing the same way, means for supporting a transparent plate and a registering device opposite said plate and sheet respectively in corresponding relation thereto, means for causing simultaneous like relative adjustments between said plate and sheet and said printing plate and registering device in a direction to locate said printing plate and registering device opposite different corresponding portions of their related plate and sheet, said adjusting means having two actuating devices located substantially at the front central portion of the apparatus and extending respectively toward the printing plate and registering device so that one of them can be conveniently operated by a person standing near either the printing plate or the registering device, and means for causing an intimate contact of said printing plate and the opposed plate.

29. In a photographic printing apparatus, the combination of means for supporting a sensitized plate and a sheet side by side facing the same way, means for supporting a transparent printing plate and another transparent plate opposite said plate and sheet respectively in corresponding relation thereto, means for causing simultaneous like relative adjustments between said plate and sheet and said transparent plates in a direction to locate said transparent plates opposite different corresponding portions of their related plate and sheet, a pressure device located back of said sensitized plate, and means for operating said pressure device to cause an intimate contact of said printing plate and its related plate, said adjusting means and said operating means for the pressure device having actuating devices located substantially at the front central portion of the apparatus.

Witness my hand, this 5th day of April, 1919.

WILLIAM C. HUEBNER.

Witnesses:
C. W. PARKER,
A. L. McGEE.